United States Patent
Choi et al.

(10) Patent No.: US 9,185,104 B2
(45) Date of Patent: Nov. 10, 2015

(54) METHOD AND APPARATUS FOR COMMUNICATION, AND METHOD AND APPARATUS FOR CONTROLLING COMMUNICATION

(75) Inventors: Hyok-Sung Choi, Seoul (KR); Sang-Kwon Lee, Suwon-si (KR); Jeong-Rok Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 862 days.

(21) Appl. No.: 12/673,618
(22) PCT Filed: Aug. 14, 2008
(86) PCT No.: PCT/KR2008/004737
§ 371 (c)(1),
(2), (4) Date: May 7, 2010
(87) PCT Pub. No.: WO2009/022869
PCT Pub. Date: Feb. 19, 2009

(65) Prior Publication Data
US 2011/0010542 A1    Jan. 13, 2011

Related U.S. Application Data

(60) Provisional application No. 60/956,201, filed on Aug. 16, 2007.

(30) Foreign Application Priority Data

Jan. 23, 2008  (KR) .................. 10-2008-0007078

(51) Int. Cl.
  *H04L 29/06*  (2006.01)
  *H04L 9/32*  (2006.01)
(52) U.S. Cl.
  CPC .......... *H04L 63/0807* (2013.01); *H04L 9/3213* (2013.01); *H04L 63/083* (2013.01); *H04L 2209/76* (2013.01)
(58) Field of Classification Search
  CPC .......................... H04L 9/3213; H04L 63/0807
  USPC .............................. 713/172, 168; 726/9, 7, 5
  See application file for complete search history.

(56) References Cited

U.S. PATENT DOCUMENTS 5,944,824 A * 8/1999 He ..................................... 726/6
7,240,192 B1 * 7/2007 Paya et al. ...................... 713/152
(Continued)

FOREIGN PATENT DOCUMENTS

CN      1681303 A    10/2005
JP   2000242705 A     9/2000
(Continued)

OTHER PUBLICATIONS

Communication, dated Jun. 5, 2012, issued by the State Intellectual Property Office of P.R. China in counterpart Chinese Application No. 200880103392.7.

(Continued)

*Primary Examiner* — Peter Shaw
(74) *Attorney, Agent, or Firm* — Sughrue Mion, PLLC (57) ABSTRACT

Method and apparatus for communication between client and service provider using external server, and a method and apparatus for controlling communication between a client and a service provider are provided. The method includes: receiving from the service provider a first authentication token indicating that the service provider has authenticated communication with the client by logging on the service provider; storing, in the external server, authentication information containing the first authentication token and additional information relating to communication with the service provider; receiving, when there is a request to access the service provider, authentication information corresponding to the request from the external server; and communicating with the service provider using the received authentication information. It is possible to alleviate the burden on a user to enter his or her ID and password, and to remove necessity for a user to enter the ID and password after registration has been performed once.

15 Claims, 8 Drawing Sheets

(56) References Cited

U.S. PATENT DOCUMENTS

| | | |
|---|---|---|
| 2002/0095571 A1* | 7/2002 | Bradee .................. 713/164 |
| 2002/0099809 A1 | 7/2002 | Lee |
| 2002/0147975 A1 | 10/2002 | Seo |
| 2003/0105812 A1 | 6/2003 | Flowers, Jr. et al. |
| 2003/0191964 A1* | 10/2003 | Satyavolu et al. ........... 713/201 |
| 2005/0039054 A1 | 2/2005 | Satoh et al. |
| 2005/0108551 A1 | 5/2005 | Toomey |
| 2005/0257072 A1* | 11/2005 | Cross et al. ................ 713/193 |
| 2006/0200681 A1* | 9/2006 | Kato et al. ................. 713/193 |
| 2007/0169181 A1 | 7/2007 | Roskind |
| 2007/0186273 A1 | 8/2007 | Carpy et al. |
| 2007/0289001 A1* | 12/2007 | Havercan .................. 726/6 |
| 2009/0240907 A1* | 9/2009 | Crandell .................. 711/163 |
| 2012/0041881 A1* | 2/2012 | Basu et al. ................ 705/67 |

FOREIGN PATENT DOCUMENTS

| | | | |
|---|---|---|---|
| JP | 2002140308 A | 5/2002 |
| JP | 2004140308 A | 5/2004 |
| JP | 2006-065690 A | 3/2006 |
| JP | 2005065690 A | 3/2006 |
| KR | 1020030042872 A | 6/2003 |
| KR | 1020050036528 A | 4/2005 |
| KR | 1020070003723 A | 1/2007 |
| KR | 100737518 B1 | 7/2007 |
| KR | 10-0869965 B1 | 11/2008 |

OTHER PUBLICATIONS

Communication dated Feb. 29, 2012 issued by the Korean Intellectual Property Office in counterpart Korean Patent Application No. 10-2007-0138599.

Communication dated Aug. 2, 2011 from the Korean Intellectual Property Office in a counterpart application No. 10-2007-0138599.

Communication, dated Jan. 20, 2014, issued by the Korean Intellectual Property Office in counterpart Korean Application No. 10-2008-0007078.

* cited by examiner

METHOD AND APPARATUS FOR COMMUNICATION, AND METHOD AND APPARATUS FOR CONTROLLING COMMUNICATION

CROSS-REFERENCE TO RELATED PATENT APPLICATIONS

This application is a National Stage of International Application No. PCT/KR2008/004737 filed Aug. 14, 2008, claiming priority based on U.S. Provisional Application No. 60/956,201 filed on Aug. 16, 2007, and Korean Patent Application No. 10-2008-0007078 filed on Jan. 23, 2008, in the Korean Intellectual Property Office, the disclosures of which are incorporated herein by reference in their entirety.

BACKGROUND

1. Field

The exemplary embodiments relate to communication and a method and apparatus for controlling communication, and more particularly, to a method and apparatus for communicating with a service provider using an external server and a method and apparatus for controlling communication between a client and a service provider.

2. Description of the Related Art

As information technologies progress, digital devices having various functions have come into the market. A digital device that traditionally provided only a single function has now become capable of providing two or more heterogeneous functions to be more convenient for a user. For example, an inter-protocol television (IPTV) set provides convergence services by adding an Internet access function to a conventional set-top box or television set.

However, it is difficult for such a digital device to have a user interface due to its natural limitation. Therefore, it is difficult for a user to access a desired website using the IPTV set. In order to overcome this shortcoming, conventional communication systems store users' IDs and passwords in a proxy server. As a result, it is possible to alleviate inconvenience to a user caused by entering an ID and password whenever the user tries to access a website. An example of a communication system having such a proxy server is a Single Sign On (SSO) model. The SSO system allows a user to be provided with services from a plurality of service providers through a single successful logon procedure.

In a typical communication system, a user should enter the ID and password each time access to a website is attempted. Furthermore, a user should enter personal information such as a name or a phone number whenever he or she initially subscribes to each website. However, in the SSO system, the user's ID and password initially entered are stored in the proxy server, and the user is allowed to access a plurality of websites using the stored ID and password without entering the ID and password again.

Figure 1:
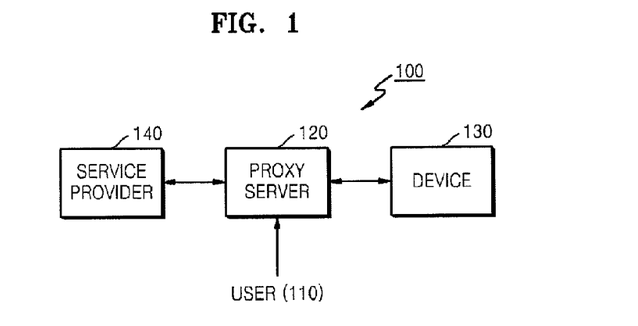
FIG. 1 illustrates a typical communication system 100 having a proxy server.

FIG. 1 illustrates a typical SSO system 100 having a proxy server.

A typical SSO system comprises: a proxy server 120; a service provider 140; and a device 130.

In the SSO system 100, a user 110 accesses the proxy server 120 to create an account and registers a device 130 to be used by the SSO system on the proxy server 120 in advance. In addition to the registration of the device 130, a user 110 directly enters an ID and password corresponding to the service provider 140 in order to receive a service of the service provider 140 on the device 130. The input ID and password are stored in the proxy server 120.

Thereafter, when the device 130 requests to access the service provider 140, the proxy server 120 logs on the service provider 140 using the stored ID and password. When the logon procedure into the service provider 140 is completed, an authentication token indicating that the service provider 140 has authenticated communication with the device 130 is transmitted to the proxy server 120. The proxy server 120 delivers the transmitted authentication token to the device 130.

The device 130 directly communicates with the service provider 140 using the authentication token delivered from the proxy server 120 or via the proxy server 120 to receive the service.

However, the conventional technology which uses the proxy server 120 for the authentication between the device 130 and the service provider 140 has some problems as described below.

In order to provide the SSO system, a plurality of service providers should previously make an agreement with one another. However, since it is substantially impossible for the service providers having different security systems to make an agreement with one another, it is difficult to incorporate a considerable number of service providers into the SSO system.

If a user 110 tries to access a non-registered service provider, the user 110 should enter the ID and password only using the proxy server 120. In order to allow a user to enter the ID and password, the user should inconveniently access the proxy server 120. Particularly, since it is substantially impossible to initially store IDs and passwords for all service providers, the aforementioned inconvenience inevitably occurs.

Additionally, since the proxy server 120 stores a plurality of IDs and passwords for a plurality of users, user information may be easily exposed to attackers if the proxy server 120 is hacked.

Furthermore, since the authentication procedure between the device 130 and the service provider 140 should be performed via the proxy server 120, load on the proxy server 120 is high, and management costs of the proxy server 120 increase.

SUMMARY

Exemplary embodiments provide a method and apparatus for communication, and a method and apparatus for controlling communication, by which security between a digital device and a service provider can efficiently reinforced.

According the exemplary embodiments, since a client corresponding to a service provider is provided in a user's terminal, an authentication procedure is performed in the user's terminal using the client.

Since the authentication procedure is performed in the user's terminal, the user's ID and password corresponding to the service provider are input from the client without accessing the proxy server. Also, since the client performs a logon procedure on the user's terminal without connection with the proxy server, the convenience of a user is improved because the user does not need to manually input his or her ID and password.

Since the authentication information containing the authentication token and the user's ID and password is stored in the external server, the user does not need to additionally enter his or her ID and password.

Since the authentication information is encrypted before stored, the authentication information is resistant to external attacks.

Since the authentication information stored in the client is shared with other associated clients, it is possible to remove inconvenience caused by requiring a user to perform a plurality of authentication procedures.

According to an aspect of an exemplary embodiment, there is provided a method of communicating between a client and a service provider using an external server, the method comprising: receiving from the service provider a first authentication token indicating that the service provider has authenticated communication with the client by logging on the service provider; storing in the external server authentication information containing the first authentication token and additional information relating to communication with the service provider; receiving, when there is a request to access the service provider, authentication information corresponding to the request from the external server; and communicating with the service provider using the received authentication information.

The additional information may contain at least one of a user's ID and password used to log on the service provider.

The authentication information may be encrypted before being stored.

The communicating with the service provider may comprise: determining whether or not the first authentication token contained in the authentication information is valid; and if it is determined that the first authentication token is invalid, receiving a valid second authentication token from the service provider using additional information contained in the authentication information.

The received authentication information may be encrypted by the client, and wherein the communicating with the service provider further comprises decrypting the received authentication information.

The method may further comprise externally receiving a user's ID or password used to perform the logon procedure.

The service provider may be incorporated into a single-sign-on (SSO) system which allows the client to communicate with a plurality of service providers using a single piece of authentication information.

The method may further comprise: registering the client on the external server before communicating with the external server; and authenticating communication with the external service.

According to another aspect of an exemplary embodiment, there is provided a method of controlling communication between a client and a service provider, the method comprising: receiving from the client a request to provide first authentication information relating to authentication between the client and the service provider; and transmitting to the client the first authentication information obtained from a database storing authentication information between at least one client and at least one service provider, wherein the first authentication information is encrypted by the client.

The first authentication information may contain an authentication token indicating that the service provider has authenticated communication with the client.

The first authentication information may further contain at least one of information on validity of the authentication token, ID used to log on the service provider and password used to log on the service provider.

The method may further comprise: receiving from the client second authentication information based on a result of communication between the client and the service provider; and updating the first authentication information stored in the database based on the received second authentication information.

The first authentication information may be shared with other client associated with the client.

The method may further comprise: determining whether or not the client has been registered; and if it is determined that the client has not been registered, requesting the client to register.

The client may be a software module released by the service provider.

According to another aspect of an exemplary embodiment, there is provided an apparatus for communicating with a service provider using an external server, the apparatus comprising: an authentication token receiver unit which receives, from the service provider, a first authentication token indicating that the service provider has authenticated communication with the client by logging on the service provider; a control unit which is adapted to store in the external server authentication information containing the first authentication token and additional information relating to communication with the service provider; an authentication information receiver unit which, when there is a request to access the service provider, receives authentication information corresponding to the request from the external server; and a communication unit which communicates with the service provider using the received authentication information.

According to another aspect of an exemplary embodiment, there is provided an apparatus for controlling communication between a client and a service provider, the apparatus comprising: an authentication information request receiver unit which receives, from the client, a request to provide first authentication information relating to authentication between the client and the service provider; a database which stores authentication information between at least one client and at least one service provider; and a transmission unit which transmits to the client the first authentication information obtained from the database, wherein the first authentication information is encrypted by the client.

BRIEF DESCRIPTION OF DRAWINGS

The above and other features and aspects of the exemplary embodiments will become more apparent by describing in detail exemplary embodiments thereof with reference to the attached drawings in which.

DETAILED DESCRIPTION

Exemplary embodiments will now be described in more detail with reference to the accompanying drawings.

Figure 2:
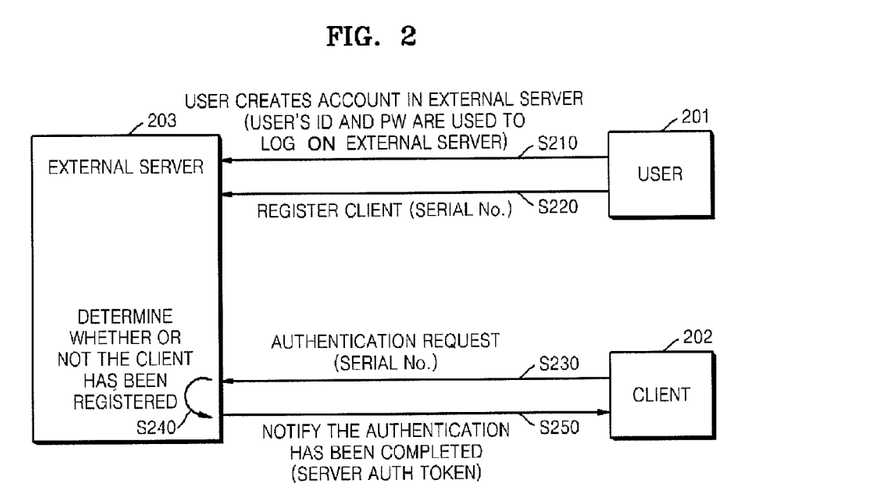
FIG. 2 illustrates an authentication procedure between a client 202 and an external server 203 according to an exemplary embodiment.

FIG. 2 illustrates an authentication procedure between a client 202 and an external server 203 according to an exemplary embodiment.

Herein, the client 202 denotes a module mounted on a communicable digital device such as an inter-protocol television (IPTV) set or a set-top box. The client 202 may be a software or hardware module. For example, if the client 202 is a software module, then it may be downloaded from the service provider and installed in the digital device when a user initially accesses the service provider using the digital device.

In operation s210, a user 201 creates her/his own account in an external server 203. The user 201 may create the account using his or her ID and password for the external server 203.

In operation s220, the user 210 registers a client 202 to be used. The user 201 logs on the external server 203, and then registers the client 202 to be used. For example, the user 201 may register a serial number of the client 202. The serial number may correspond to the client 202 or the digital device having the client 202.

In operation s230, when power is supplied to the client 202, the client 202 requests authentication with the external server 203.

In operation s240, the external server 203 determines whether or not the requesting client 202 has been previously registered using a serial number of the client 202. If it is determined that the client 202 has not been previously registered, a registration request message may be transmitted to the client 202.

In operation s250, if it is determined that the client 202 has been previously registered, the external server 203 transmits a server authentication token to the client 202. Herein, the server authentication token denotes information indicating that the external server 203 has authenticated communication with the client 202. The server authentication token is used when the client 202 tries to communicate with the external server 203 thereafter. Unlike in conventional technologies, a user 201 does not enter the ID and password used to logon the service provider on the external server 203 in FIG. 2. Therefore, it is possible to remove the existing inconvenience caused by the necessity for the user 201 to access the proxy server and then enter the ID and password in order to log on the service provider for which the user (including his or her ID and password) has not been registered.

Figure 3:
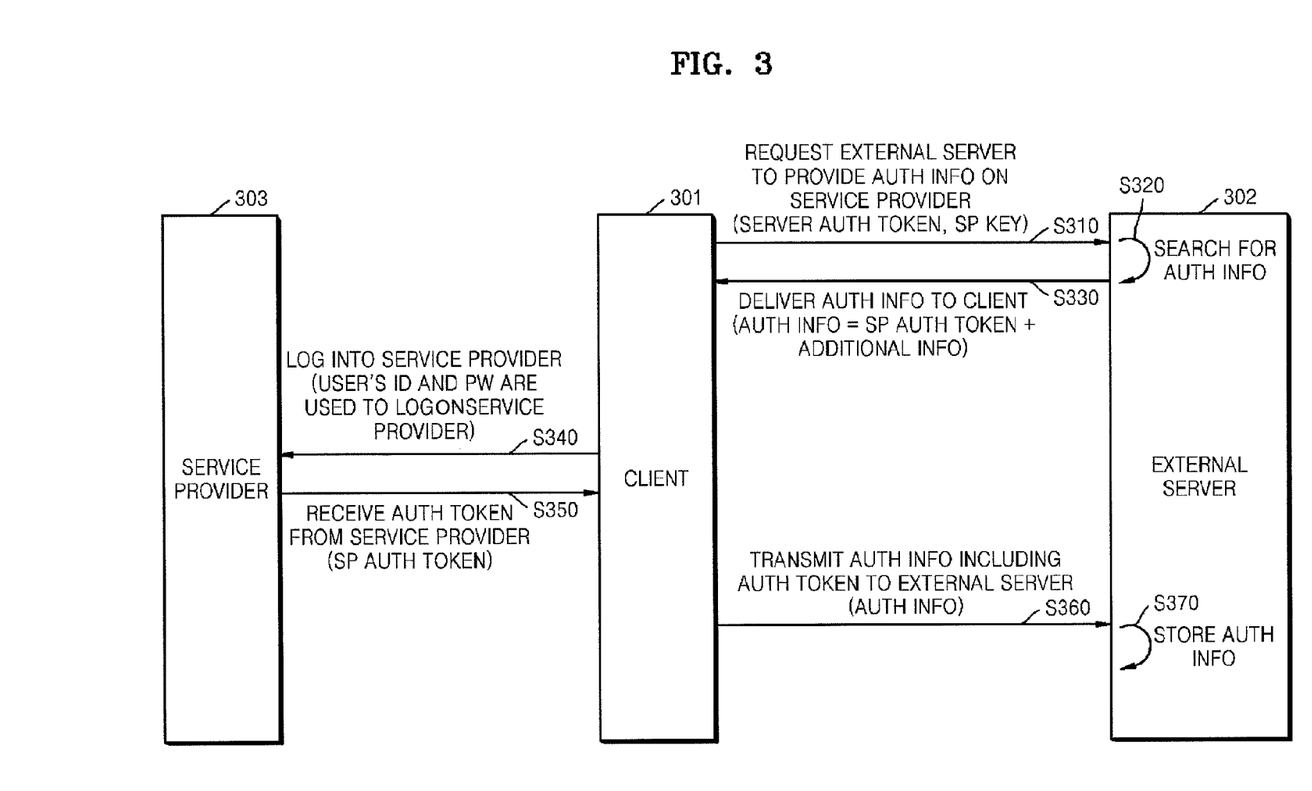
FIG. 3 illustrates an authentication procedure between a client 302 and a service provider 303 using an external server 302 according to an exemplary embodiment.

FIG. 3 illustrates an authentication procedure between a service provider 303 and a client 302 using an external server 302 according to an exemplary embodiment.

In operation s310, the client 301 requests the external server 302 to transmit authentication information for the service provider 303. The authentication information may contain a service provider authentication token (also, referred to as an SP authentication token) indicating that the service provider 303 has authenticated communication with the client 301 and additional information regarding communication with the service provider 303. The client 301 transmits a service provider key (also, referred to as an SP key) for identifying the service provider 303 and a server authentication token to the external server 302.

In operation s320, the external server 302 searches for the authentication information requested by the client 301 from an internal database.

In operation s330, the external server 302 transmits found authentication information to the client 301.

In operation s340, the client 301 determines whether or not the SP authentication token contained in the received authentication information is valid. If it is determined that the SP authentication token is valid, the authentication procedure in FIG. 3 is terminated. Otherwise, if it is determined that the SP authentication token is invalid, the remaining authentication procedure continues to be performed.

In operation s340, the client 301 directly logs on the service provider 303 using the additional information contained in the received authentication information. The additional information contains the user's ID and password used to log on the service provider 303. The additional information may not contain the user's ID and password when the client 301 initially tries to log on the service provider 303. In this case, the user's ID and password should be entered by a user to perform the logon procedure. It is sufficient for the user to enter the ID and password once. Particularly, unlike the conventional method, the client 301 automatically inputs the user's ID and password without accessing the external server 302. Also, the client 301 performs the logon procedure without using the external server 301.

In operation s350, the service provider 303 authenticates the client 301 and immediately transmits the SP authentication token to the client 301.

In operation s360, the client 301 encrypts authentication information containing the received SP authentication token and the user's ID and password using its own encryption mechanism and transmits it to the external server 302 together with the SP key. It is noted that the authentication information may contain additional information such as the types of service most recently provided to the client 301 and webpages most recently accessed by the client 301, and the additional information may be encrypted together with the authentication information.

In operation s370, the external server 302 stores the received authentication information by pairing it with the received SP key. Since the SP authentication token and the user's ID and password are encrypted and stored according to the exemplary embodiments, it is possible to remove security vulnerability of the conventional Single Sign On (SSO) system. In addition, the external server 302 may store the authentication information on a user basis so that it can be shared with other clients associated with the client 301. An example of sharing the authentication information between the client 301 and other associated clients will be described in association with FIG. 5.

At the moment that power is supplied to the client 301, a user can obtain authentication tokens corresponding to each service provider by performing the aforementioned operations for all of the service providers previously registered by the user.

Figure 4:
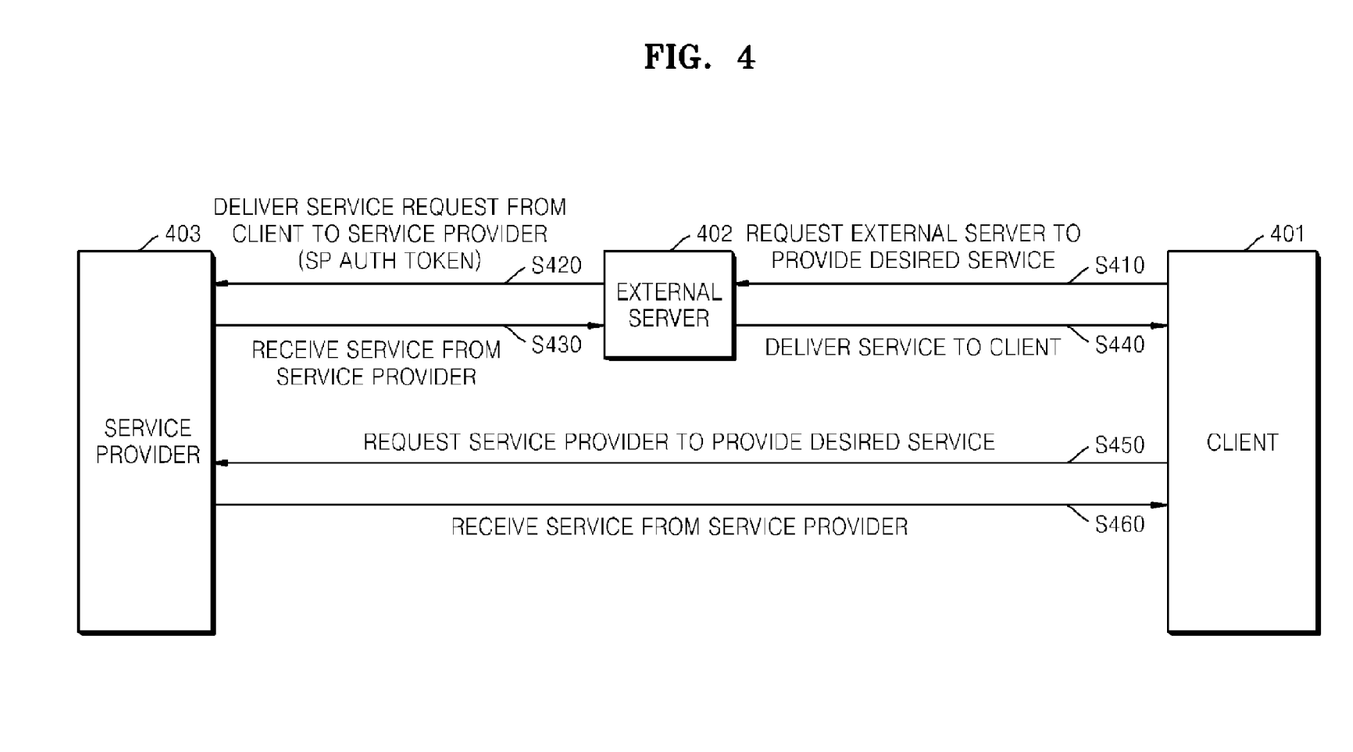
FIG. 4 illustrates a communication procedure between a client 401 and a service provider 403 according to an exemplary embodiment.

FIG. 4 illustrates a communication procedure between a client 401 and a service provider 403 according to an exemplary embodiment.

The client 401 which has obtained the SP authentication token as shown in FIG. 3 may communicate with the service provider 403 via the external server, or may directly communicate with the service provider 403.

In operation s410 to s440, the client 401 communicates with the service provider 403 via the external server 402.

In operation s410, the client 401 requests the external server 402 to provide a service using the server authentication token. The service may include various kinds of data such as metadata or A/V data that can be provided by the service provider 403. It is noted that the client 401 may transmit the SP authentication token to the external server 402 in order for the external server 402 to communicate with the service provider 403.

In operation s420, the external server 402 requests the service provider 403 to provide the service requested by the client 401 using the SP authentication token.

In operation s430, the service provider 403 delivers the service requested by the client 401 to the external server 402.

In operation s440, the external server 402 delivers the service received from the service provider 403 to the client 401.

In operation s450 and s460, the client 401 directly communicates with the service provider 403 without using the external server 402.

In operation s450, the client 401 requests the service provider 403 to provide a desired service using the SP authentication token.

In operation s460, the service provider 403 transmits the service requested by the client 401 to the client 401.

Figure 5:
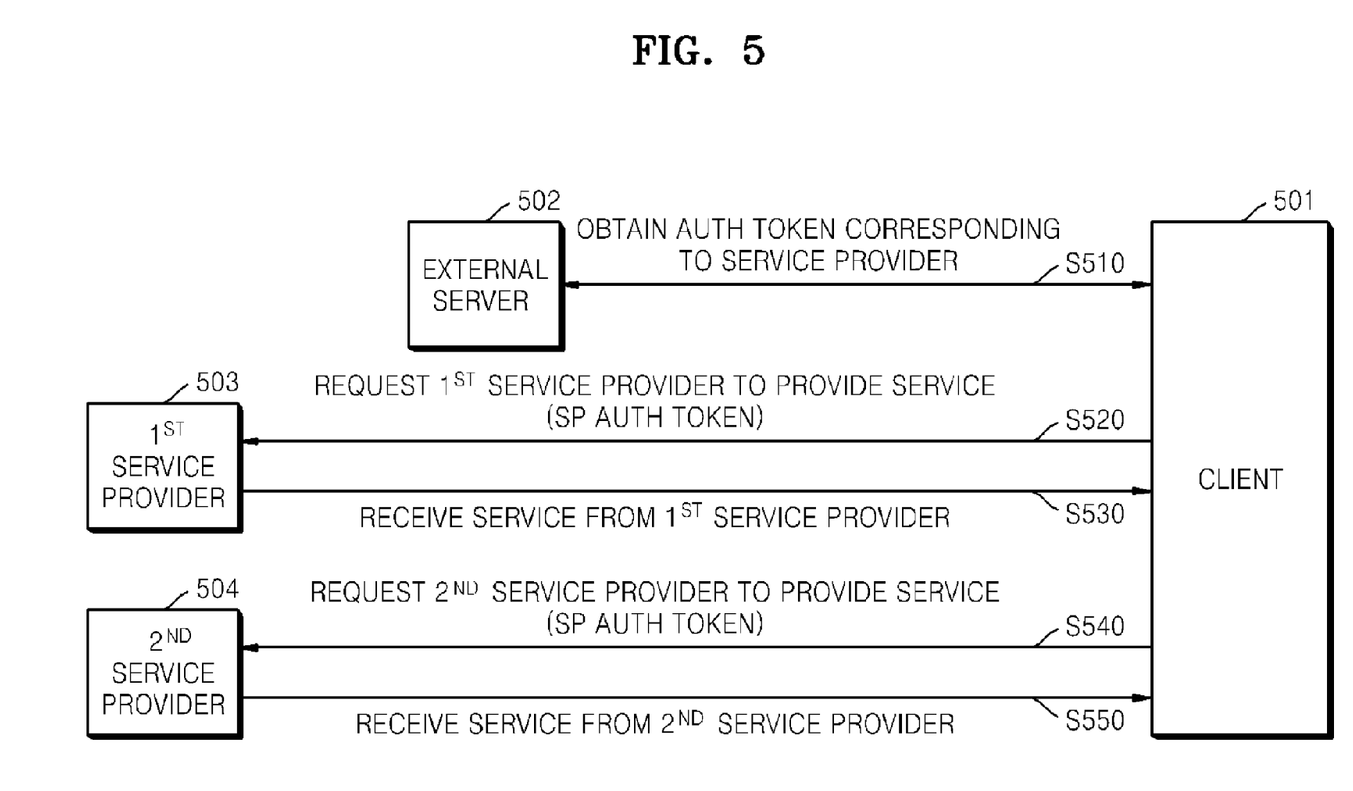
FIG. 5 illustrates a communication procedure between a second client 501 and service providers 503 and 504 using an SP authentication token obtained by a first client (not shown) according to an exemplary embodiment.

FIG. 5 illustrates a communication procedure between a second client 501 and service providers 503 and 504 using an SP authentication token obtained by a first client (not shown) according to an exemplary embodiment.

In operation s510, the second client 501 receives authentication information for the first service provider 503 from the external server 502. It is noted that the second client 501 may receive authentication information obtained by a first client (not shown) as a different associated client. The different client associated with the second client 501 may include other clients used by the user of the second client 501.

In operation s520, the second client 501 requests the first service provider 503 to provide a service using the SP authentication token contained in the authentication information.

In operation s530, the first service provider 503 transmits the service requested by the second client 501 to the second client 501.

In operation s540, the second client 501 requests the second service provider 504 to provide a service. If the first and second service providers 503 and 504 are incorporated into a single SSO system, the second client 501 requests the second service provider 504 to provide a service using the SP authentication token contained in the authentication information received in operation s510. Otherwise, if the first and second service providers 503 and 504 are not incorporated into a single SSO system, the second client 501 should newly receive authentication information corresponding to the second service provider 504 from the external server 502.

In operation s550, the second service provider 504 transmits the service requested by the second client 501 to the second client 501.

Figure 6:
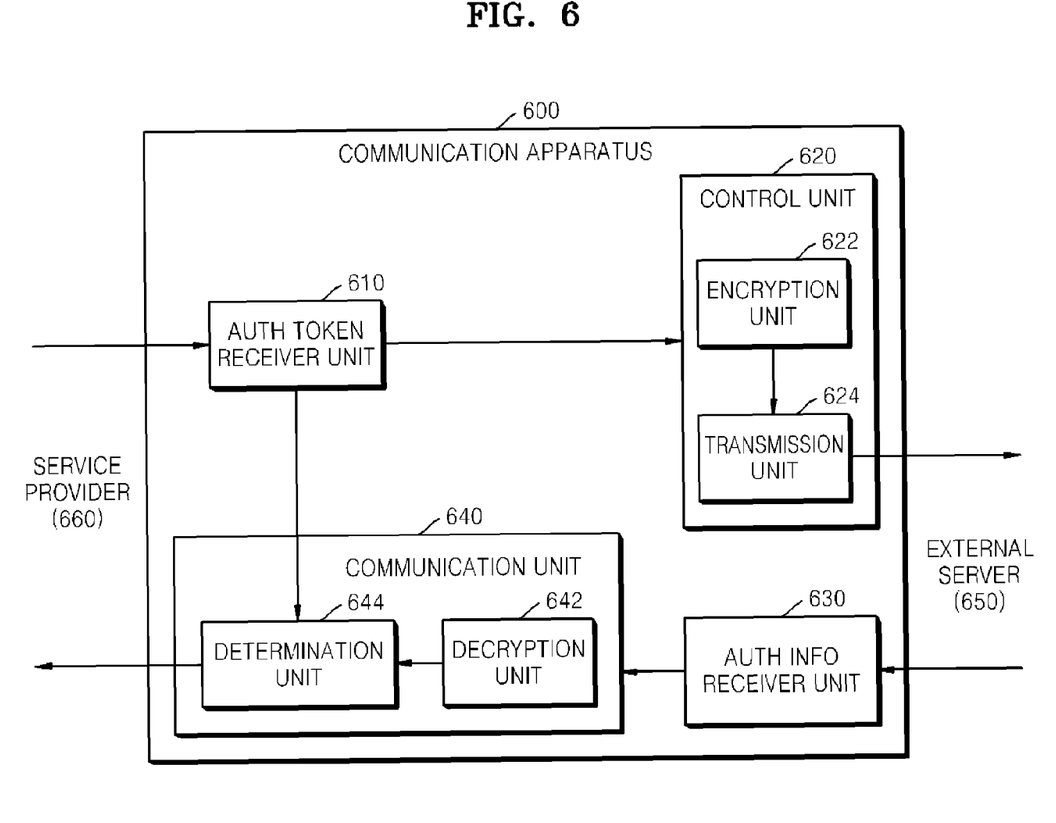
FIG. 6 is a block diagram illustrating a communication apparatus 600 according to an exemplary embodiment.

FIG. 6 is a block diagram illustrating a communication apparatus 600 according to an exemplary embodiment. The communication apparatus 600 according to the exemplary embodiment is mounted on a user terminal such as an IPTV set to perform authentication with the service provider 660. The communication apparatus 600 may be implemented in a hardware or software module. When it is implemented in a software module, the communication apparatus 600 may be installed in a user terminal by receiving a corresponding application program from the service provider 660.

The communication apparatus 600 according to the exemplary embodiment comprises: an authentication token receiver unit 610; a control unit 620; an authentication information receiver unit 630; and a communication unit 640. The communication apparatus 600 according to the exemplary embodiment communicates with the service provider 660 via an external server 650.

The authentication token receiver unit 610 receives, from the service provider, 660 a first authentication token indicating that the service provider 660 has authenticated communication with the communication apparatus 600 by logging on the service provider 660. The first and second authentication tokens shown in FIGS. 6 to 10 indicate that the service provider 660 has authenticated communication with the communication apparatus 600, and correspond to the SP authentication tokens shown in FIGS. 2 to 5.

The authentication token receiver unit 610 may log on the service provider 660 using the user's ID and password contained in the authentication information received by the authentication information receiver unit 630, which will be described later. However, if the authentication information is not stored in the external server 650 when the communication apparatus 600 initially accesses the service provider 660, the authentication token receiver unit 610 prompts the user to enter the user's ID and password. In the latter case, the communication apparatus 600 may further comprise an input request unit (not shown) which requests a user to enter the ID or password used to perform the logon procedure.

The control unit 620 is adapted to store authentication information containing a first authentication token and additional information relating to the communication with the service provider 660 in the external server 650. The additional information contains at least one of the user's IDs and passwords used for the communication apparatus 600 to log on the service provider 660. The additional information may contain any other information relating to communication with the service provider 660 in addition to the authentication information. For example, the additional information may contain information on a service most recently provided to the communication apparatus 600 and a service list provided by the service provider 660 so as to allow the communication apparatus 600 to readily communicate with the service provider 660 thereafter.

The control unit 620 may comprises an encryption unit 622 and a transmission unit 624.

The encryption unit 622 encrypts the authentication information using an encryption mechanism used by the communication apparatus 600 so as to avoid the authentication information from being externally attacked.

The transmission unit 624 transmits the encrypted authentication information to the external server 650 to store the encrypted authentication information in the external server 650.

The authentication information receiver unit 630 receives the authentication information from the external server 650 in response to a request to access the service provider 660. Herein, the received authentication information has been encrypted using an encryption mechanism of the communication apparatus 600.

The communication unit 640 communicates with the service provider 660 using the received authentication information.

The communication unit 640 may comprise a decryption unit 642 and a determination unit 644.

The decryption unit 642 decrypts the received authentication information.

The determination unit 644 determines whether or not the first authentication token contained in the authentication information is valid. For this purpose, the determination unit 644 may extract information relating to validity expiration of the first authentication token contained in the authentication information. The information relating to validity expiration of the first authentication token may be provided by the service provider 660, and may be set such that the validity is expired when the power is cut off or when after a predetermined time period has elapsed.

If the first authentication token is valid, the communication unit 640 requests the service provider 660 to provide a desired service using the first authentication token.

Otherwise, if the first authentication token is invalid, the authentication token receiver unit 610 is controlled to receive a valid second authentication token. In this case, the authentication token receiver unit 610 receives the valid second authentication token from the service provider 660 by allowing a user to log on the service provider 660 using additional information contained in the authentication information or by allowing the user to enter his or her ID and password.

The communication apparatus 600 communicates with a desired service provider by repeating the aforementioned method for each service provider. If a service provider is incorporated into a SSO system which allows a service provider to communicate with a plurality of service providers using a single piece of authentication information, it is possible to communicate with a plurality of service providers by obtaining a single piece of authentication information using the aforementioned procedures.

The communication apparatus 600 according to the exemplary embodiment may further comprise a registration unit (not shown) and a communication authentication unit (not shown).

The registration unit (not shown) registers the communication apparatus 600 on an external server 650 before the communication apparatus 600 communicates with the external server 650.

If the communication apparatus 600 has already been registered, the communication authentication unit (not shown) authenticates communication with the external server 650.

Figure 7:
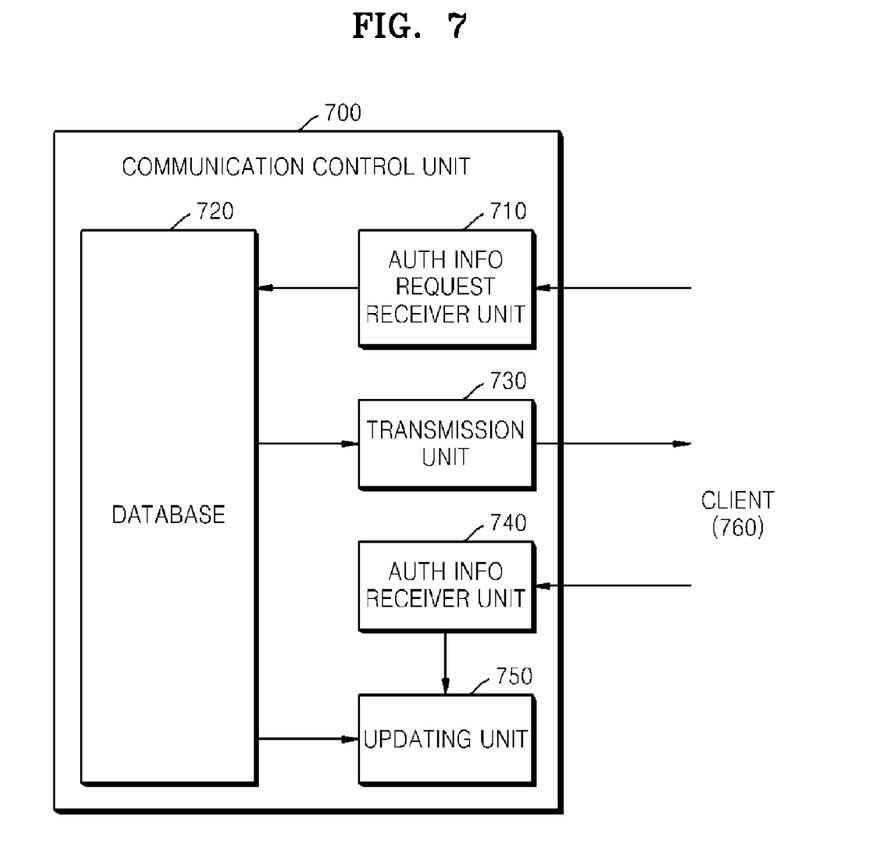
FIG. 7 is a block diagram illustrating a communication control apparatus 700 according to an exemplary embodiment.

FIG. 7 is a block diagram illustrating a communication control apparatus 700 according to an exemplary embodiment.

The communication control apparatus 700 according to the exemplary embodiment may comprise an authentication information request receiver unit 710, a database 720, a transmission unit 730, an authentication information receiver unit 740, and an updating unit 750. The communication control apparatus according to the exemplary embodiment controls communication between a client 760 and a service provider.

The client 760 is mounted on a user terminal such as an IPTV set to authenticate a service provider 660. The client 760 may be implemented in a hardware or software module. If the client 760 is implemented in a software module, it may be downloaded from a service provider and installed in the user terminal.

The authentication information request receiver unit 710 receives, from the client 760, a request to provide first authentication information relating to information on authentication between the client 760 and a service provider (not shown). In FIG. 7, the first authentication information is necessary for the client 760 to communicate with a service provider (not shown). The first authentication information may be encrypted by the client 760, and may contain an authentication token indicating that a service provider (not shown) has authenticated communication with the client 760. In addition, the first authentication information may contain information on validity of the authentication token, and at least one of the user's IDs and passwords used for the client 760 to log on the service provider (not shown).

The communication control apparatus 700 may further comprise a determination unit (not shown) for determining whether or not the client 760 has been registered before the authentication information request is received from the client 760. For example, the communication control unit 700 may store serial numbers of the clients 760 previously registered in the database, and the determination unit (not shown) may determine whether or not the serial number of the client 760 has been registered.

The communication control apparatus 700 may further comprise a registration request unit (not shown). If the determination unit (not shown) determines that the client has not been registered, the registration request unit (not shown) requests the client 760 to register.

The database 720 stores authentication information between at least one client and at least one service provider. The first authentication information stored in the database 720 may be shared with other clients associated with the client 760. For this purpose, the first authentication information may be classified not on a client basis but on a user basis. In other words, when a user of the first client is the same as that of the second client, the authentication information received from the first client may be used for the second client.

The transmission unit 730 searches the database 720, and transmits the obtained first authentication information to the client 760.

The authentication information receiver unit 740 receives, from the client 760, second authentication information based on a result of the communication between the client 760 and the service provider (not shown). The second authentication information also contains an authentication token indicating that the service provider has authenticated communication with the client 760 and additional information relating to communication between the client 760 and the service provider.

The updating unit 750 converts the first authentication information stored in the database into second authentication information.

Figure 8:
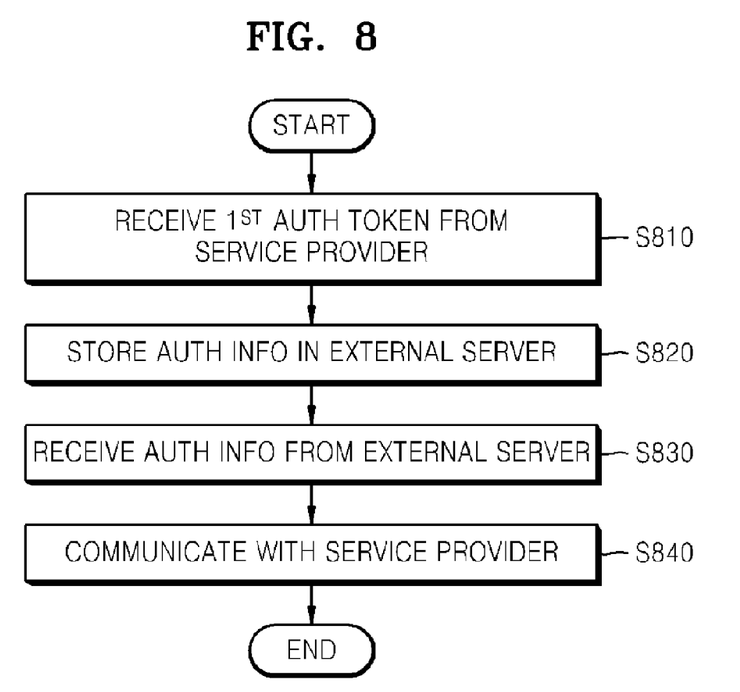
FIG. 8 is a flowchart illustrating a communication method according to an exemplary embodiment.

FIG. 8 is a flowchart illustrating a communication method according to an exemplary embodiment.

In operation s810, a first authentication token indicating that the service provider has authenticated communication with the client is received from the service provider by logging on the service provider.

In operation s820, authentication information containing the authentication token and additional information relating to communication with the service provider is stored in an external server. The additional information may contain the user's ID or password used to log on the service provider, and the authentication information may be encrypted before being stored.

In operation s830, when there is a request to access the service provider, authentication information is received from the external server in response to the request.

In operation s840, communication with the service provider is performed using the received authentication information. If the authentication information has been encrypted, decryption corresponding to the encryption is performed. In operation s840, it is determined whether or not the first authentication token contained in the authentication information is valid in order to communicate with the service provider. If it is determined that the first authentication token is valid, communication with the service provider is performed using the first authentication token. Otherwise, if it is determined that the first authentication token is invalid, a valid second authentication token is received from the service provider using the additional information contained in the authentication information. Then, communication with the service provider is performed using the second authentication token.

Figure 9:
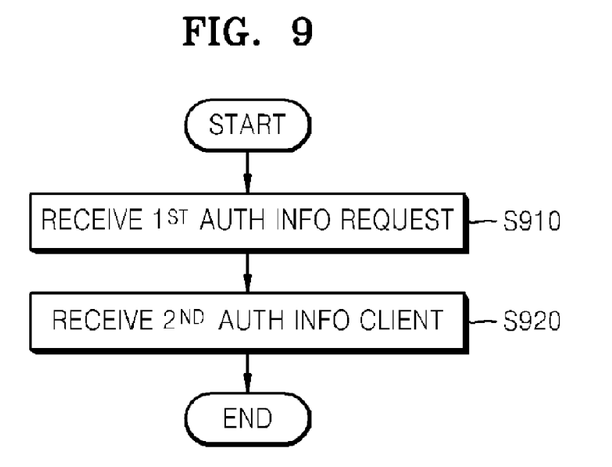
FIG. 9 is a flowchart illustrating a communication control method according to an exemplary embodiment.

FIG. 9 is a flowchart illustrating a communication control method according to an exemplary embodiment.

In operation s910, a request is received from the client, to provide first authentication information relating to authentication between the client and the service provider. The first authentication information may contain an authentication token indicating that the service provider has authenticated communication with the client, information on validity of the authentication token, and the user's ID and password used for the client to log on the service provider.

In operation s920, first authentication information obtained from a database storing information on authentication between at least one client and at least one service provider is transmitted to the client. The database stores authentication information encrypted by a corresponding client. The authentication information is classified and stored on a user basis in order to share the authentication information by other clients used by the same user.

In the communication control method according to the exemplary embodiment, the second authentication information based on a result of the communication between the client and the service provider is received from the client, and the first authentication information stored in the database is updated based on the received second authentication information.

Figure 10:
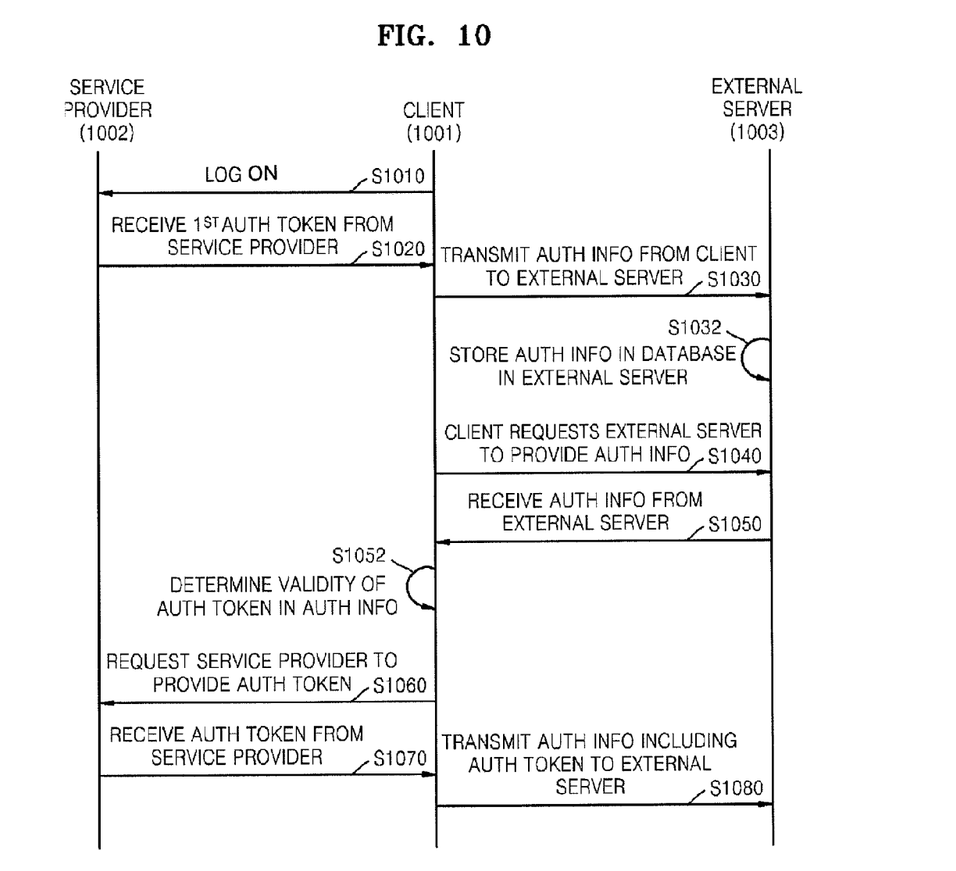
FIG. 10 illustrates a data flow in a communication system according to an exemplary embodiment.

FIG. 10 illustrates a data flow in a communication system according to an exemplary embodiment.

In operation s1010, the client 1001 logs on the service provider 1002. The ID and password of a user used for the logon procedure may be received from an external server 1003, or entered directly by the user if the external server does not store them.

In operation s1020, the service provider 1002 transmits to the client 1001 a first authentication token indicating that communication with the client 1001 has been authenticated. Afterwards, the client 1001 will be provided with a service from the service provider 100 using the first authentication token.

In operation s1030, the client 1001 transmits the authentication information to the external server 1003. The authentication information contains the first authentication token received in operation s1020 and additional information relating to communication with the service provider. The additional information may contain at least one of the user's IDs and passwords used for the client 1001 to log on the service provider 1003. The client 1001 encrypts the authentication information using its own encryption mechanism and then, transmits the encrypted authentication information to the external server 1003.

In operation s1032, the external server 1003 stores the authentication information in a database in the external server 1003. In this case, the authentication information is classified and stored so as to be shared with the client 1001 as well as other clients associated with the client 1001. For example, the authentication information may be classified and stored on a user basis in order to share the authentication information with other clients which are also used by the user of the client 1001.

In operation s1040, when there is a request to access the service provider 1002, the client 1001 requests the external server 1003 to provide the authentication information.

In operation s1050, the client 1001 receives the authentication information from the external server 1003. The authentication information contains the first authentication token and additional information relating to communication with the service provider as described in association with operation s1030.

In operation s1052, the client 1001 determines whether or not the first authentication token is valid. If it is determined that the first authentication token is valid, the client 1001 communicates with the service provider 1002 using the first authentication token. Otherwise, if it is determined that the first authentication token is invalid, the client 1001 performs operations s1060 to s1070 in order to obtain a valid authentication token.

In operation s1060, the client 1001 requests the service provider 1002 to provide an authentication token. In other words, the client 1001 logs on the service provider 1002 using the user's ID and password contained in the additional information.

In operation s1070, the service provider 1002 delivers a valid second authentication token to the client 1001.

In operation s1080, the client 1001 communicates with the service provider using the second authentication token. Also, the client 1001 creates second authentication information containing the second authentication token and additional information relating to communication with the service provider 1003, and stores it in the external server 1003.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A method of communicating between a client and a service provider using an external server, the method comprising:

an authentication process comprising:

the client logging on to the service provider and receiving, from the service provider, a first authentication token indicating that the service provider has authenticated communication with the client;

the client, storing in the external server, authentication information containing the first authentication token and additional information relating to communication with the service provider; and an access process, when there is a request to access the service provider, the access process comprising:

the client receiving, from the external server, authentication information obtained by the client or a different associated client, corresponding to the request, wherein in the authentication information is usable by the client or the different associated client to gain access to service provider;

the client determining whether or not the first authentication token contained in the authentication information is valid;

if it is determined that the first authentication token is valid, the client communicating with the service provider using the authentication information received from the external server without logging on to the service provider subsequent to the authentication process; and if it is determined that the first authentication token is invalid, the client receiving a valid second authentication token from the service provider using additional information contained in the authentication information.

2. The method according to claim 1, wherein the additional information contains at least one of a user's ID and password used to log on the service provider.

3. The method according to claim 1, wherein the authentication information is encrypted before being stored.

4. The method according to claim 1, wherein the received authentication information is encrypted by the client, and wherein the communicating with the service provider further comprises decrypting the received authentication information.

5. The method according to claim 1, further comprising: the client receiving, from an external source, a user's ID or password used to log on the service provider.

6. The method according to claim 1, wherein the service provider is incorporated into a single-sign-on (SSO) system which allows the client to communicate with a plurality of service providers using a single piece of authentication information.

7. The method according to claim 1, further comprising: registering the client on the external server before communicating with the external server; and authenticating communication with the external server.

8. A client apparatus for communicating with a service provider using an external server, the client apparatus comprising:

an authentication token receiver unit which receives, from the service provider, a first authentication token indicating that the service provider has authenticated communication with the client, by the client apparatus logging on to the service provider during an authentication process;

a control unit which is adapted to store, in the external server, authentication information containing the first authentication token and additional information relating to communication with the service provider;

an authentication information receiver unit which, when, during an access process, subsequent to the authentication process, there is a request to access the service provider, receives, from the external server, authentication information obtained by the client apparatus or an apparatus of a different associated client corresponding to the request, wherein in the authentication information is usable by the client apparatus or the different associated client to gain access to service provider;

a communication unit which communicates with the service provider using the authentication information received from the external server without logging on to the service provider, subsequent to the authentication process;

a determination unit which determines whether or not the first authentication token contained in the authentication information is valid; and if it is determined that the first authentication token is invalid, the authentication token receiver unit receives a valid second authentication token from the service provider using the additional information contained in the authentication information.

9. The client apparatus according to claim 8, wherein the additional information contains a user's ID and a password used to log on the service provider.

10. The client apparatus according to claim 8, wherein the control unit comprises:

an encryption unit which encrypts the authentication information; and a transmission unit which transmits the encrypted authentication information to the external server.

11. The client according to claim 8, wherein the received authentication information is encrypted by the client, and the communication unit further comprises a decryption unit for decrypting the authentication information.

12. The client apparatus according to claim 8, further comprising an input request unit which requests a user to enter an ID and password used to log on the service provider.

13. The client apparatus according to claim 8, wherein the service provider is incorporated into a single-sign-on (SSO) system which allows the apparatus to communicate with a plurality of service providers using a single piece of authentication information.

14. The client apparatus according to claim 8, further comprising:

a registration unit which registers the client apparatus on the external server before communication with the external server; and a communication authentication unit which authenticates communication with the external server.

15. A non-transitory computer-readable medium having embodied thereon a computer program for a method of communicating between a client and a service provider using an external server, method comprising:

an authentication process comprising:

the client logging on to the service provider and receiving, from the service provider, a first authentication token indicating that the service provider has authenticated communication with the client; and the client, storing in the external server, authentication information containing the first authentication token and additional information relating to communication with the service provider; and an access process, when there is a request to access the service provider, the access process comprising:

the client receiving, from the external server, authentication information obtained by the client or a different associated client, corresponding to the request;

the client determining whether or not the first authentication token contained in the authentication information is valid;

if it is determined that the first authentication token is valid, the client communicating with the service provider using the authentication information received from the external server without logging on to the service provider, subsequent to the authentication process; and if it is determined that the first authentication token is invalid, the client receiving a valid second authentication token from the service provider using additional information contained in the authentication information.

* * * * *